United States Patent [19]
Ziegler

[11] Patent Number: 5,961,259
[45] Date of Patent: Oct. 5, 1999

[54] ROTATABLE TYPE MACHINE TOOL

[76] Inventor: Karl Ziegler, 2 Birrell Court, Kew, Victoria 3101, Australia

[21] Appl. No.: 08/945,707

[22] PCT Filed: Apr. 23, 1996

[86] PCT No.: PCT/AU96/00234

§ 371 Date: Oct. 23, 1997

§ 102(e) Date: Oct. 23, 1997

[87] PCT Pub. No.: WO96/33833

PCT Pub. Date: Oct. 31, 1996

[30] Foreign Application Priority Data

Apr. 27, 1995 [AU] Australia .................................. PN2683

[51] Int. Cl.[6] ......................................................... B23B 29/08
[52] U.S. Cl. .............................. 408/181; 407/37; 407/45; 407/76; 407/78; 408/185; 408/197; 408/233
[58] Field of Search .................................. 407/37, 45, 76, 407/88; 408/153, 181, 182, 185, 186, 197, 198, 231, 233, 713

[56] References Cited

U.S. PATENT DOCUMENTS

| | | | |
|---|---|---|---|
| 3,296,897 | 1/1967 | Konwal | 408/181 |
| 3,704,958 | 12/1972 | Gulibon et al. | 408/181 |
| 3,795,454 | 3/1974 | Elchyshyn | 408/197 |
| 4,101,239 | 7/1978 | Wohlhaupter | 408/182 |
| 4,784,542 | 11/1988 | Tack et al. | 409/234 |
| 4,848,199 | 7/1989 | Kelm | 82/159 |
| 5,040,931 | 8/1991 | Spivey et al. | 408/181 |
| 5,330,297 | 7/1994 | Engstrand | 408/197 |

FOREIGN PATENT DOCUMENTS

| | | |
|---|---|---|
| 0215182 A1 | 3/1987 | European Pat. Off. . |
| 2813575 | 10/1978 | Germany ............................... 408/181 |
| 3130484A1 | 2/1983 | Germany . |
| 3343969 | 6/1984 | Germany ............................... 408/181 |
| 1071046 | 6/1967 | United Kingdom . |
| 1086518 | 10/1967 | United Kingdom . |
| 2150481 | 7/1985 | United Kingdom . |

*Primary Examiner*—Steven C. Bishop
*Attorney, Agent, or Firm*—Wolf, Greenfield & Sacks, P.C.

[57] ABSTRACT

A rotatable machine tool such as a precision boring tool has a head (2) that is detachably mounted on a shank type driving element (3). The head carries a removable cutting tip (9) and includes a bearing point (8) that wedgingly seats within a transverse slideway (7) in driving element (3). A slide (11), which is mounted in through bore (20) in head (2), has a male member (10) attached thereto which passes through a slot (24) extending between the bore (20) and an end face (19) of the head (2). Male member (10) is received within a bore (12) in driving element (3). A clamping screw (13) in drive element (3) interacts with male member (10) to cam it inwardly thereby clamping head (2) in position on drive element (3). The head (2) is transversely adjustable within slideway (7) by loosening screw (13) and adjusting opposed screws (32, 33) in head (2) which act on male member (10). The invention provides a driving interconnection between the drive element (3) and head (2) that is highly rigid, provides for easy diameter-wise adjustment of the head and is readily able to be assembled and disassembled for exchange of one head for another.

14 Claims, 4 Drawing Sheets

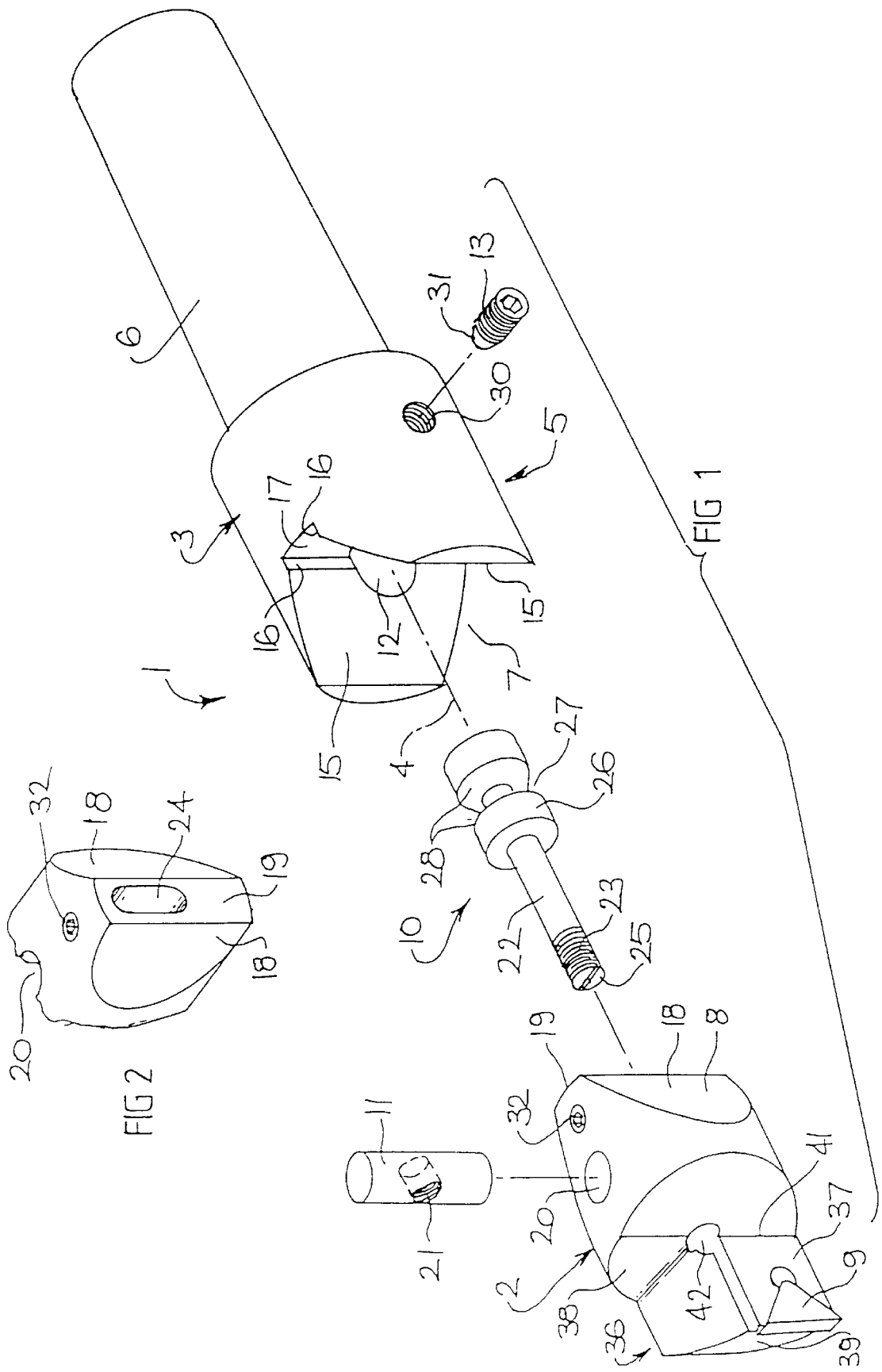

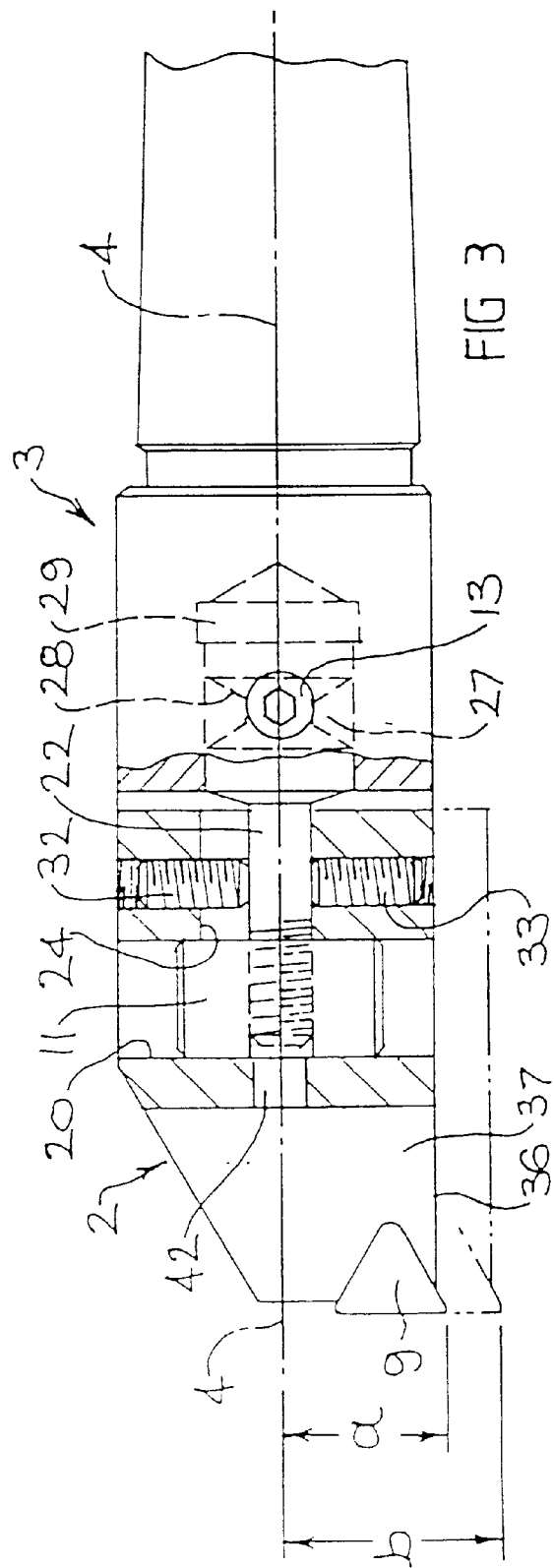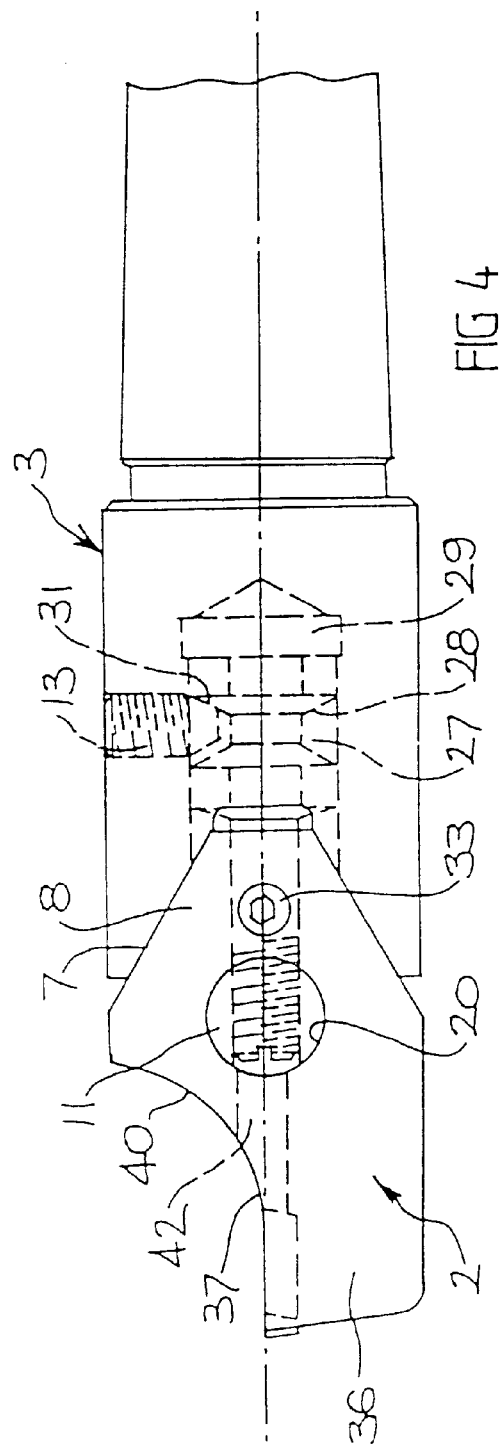

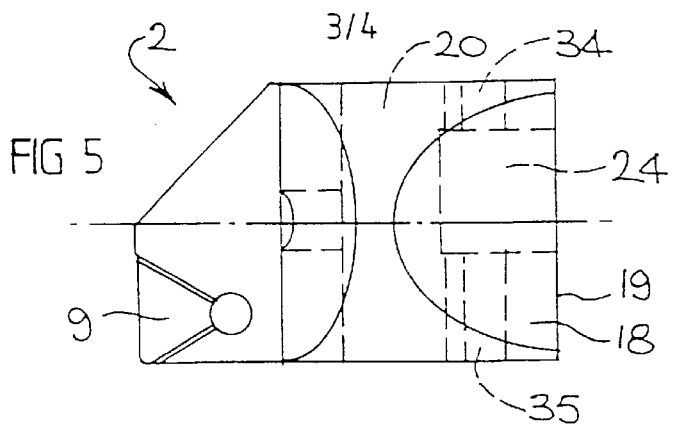
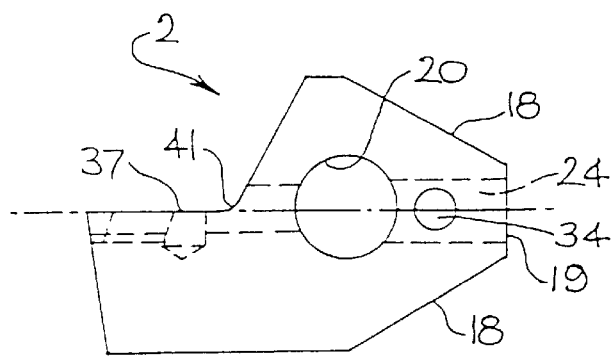
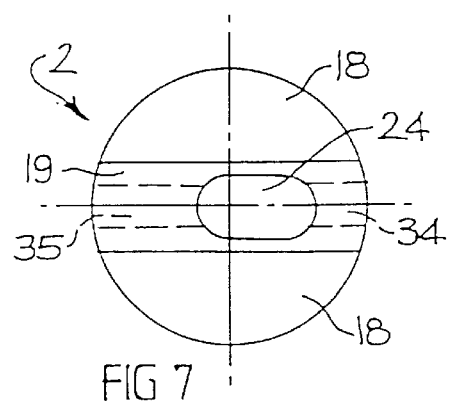
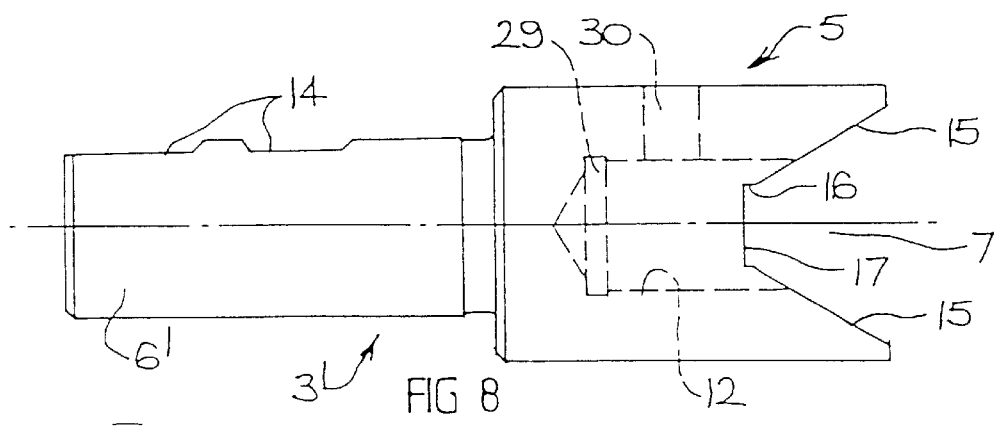
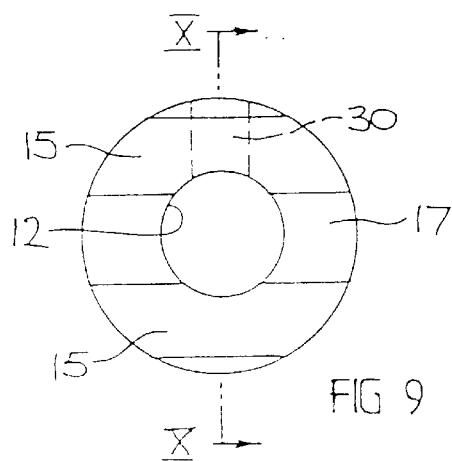
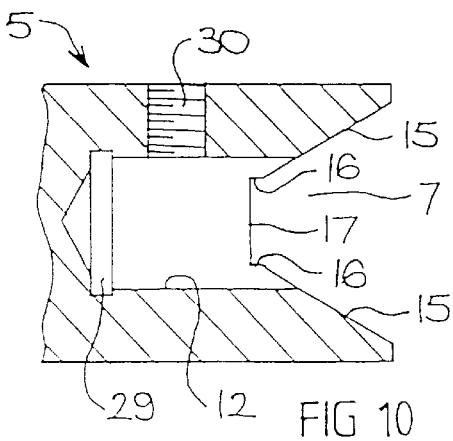

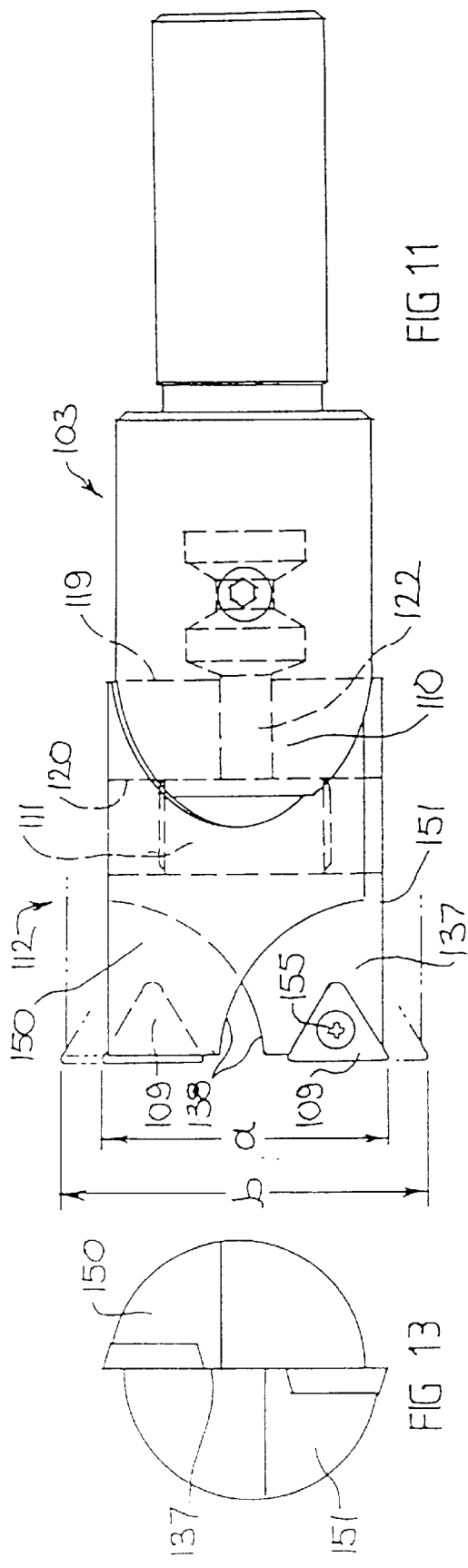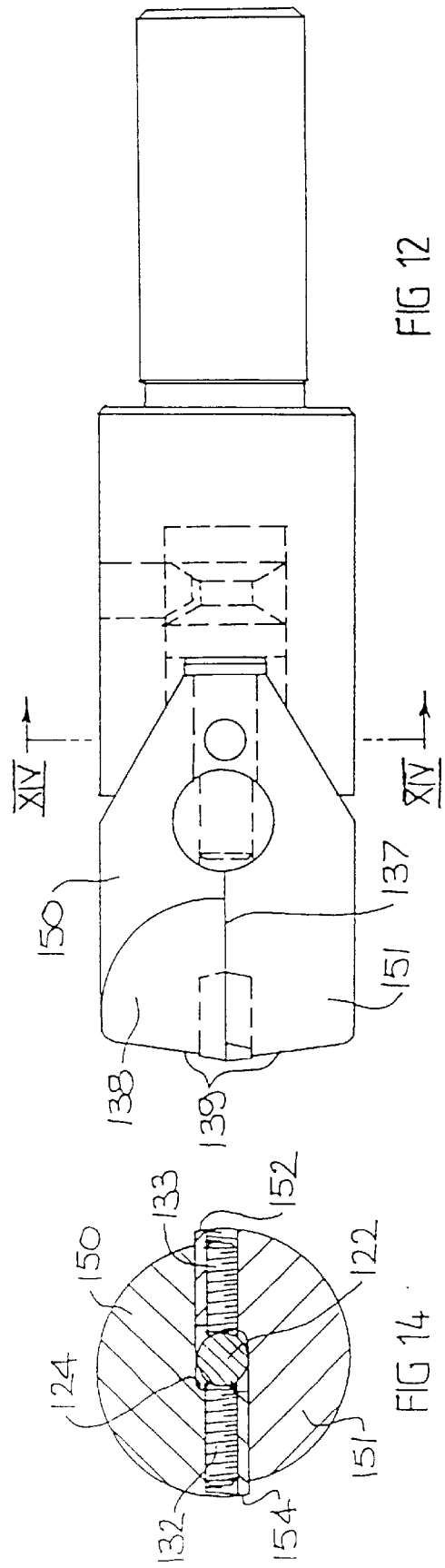

ROTATABLE TYPE MACHINE TOOL

TECHNICAL FIELD

This invention relates to machine tools of the rotatable type as are used, for example, in metal drilling or boring operations. In particular, the invention relates to rotatable tools in which a head, which usually carries a cutting means, is interchangeably assembled with a drive element, such as a shank that is directly mountable in a driving machine, or an intermediate piece, such as an extension or diameter reduction piece, which piece may be in turn assembled to a shank.

The invention is concerned with an interchangeable connection between the head and a drive element in such tools and with a mechanism for transversely adjusting the position of the head, and thereby usually a cutting means, relative to a drive element, for example to allow the tool to be adjusted to provide different boring or drilling diameters.

BACKGROUND ART

In rotatable cutting tools having a cutting head that is separable from a driving element such as a shank, it is necessary that the driving interconnection between the two be as rigid as possible while allowing them to be relatively readily assembled and disassembled.

German published patent application DE 31 30 484 A1 discloses a rapid change tool holder comprising a shank and a head. The head carries a cutting insert and is detachably clamped to the shank. The facing end surfaces of the shank and the head are shaped to provide a "multiple form-locking" of one to the other. The multiple form-locking that is disclosed comprises two protrusions on the shank, each having the cross section of an equilateral triangle, and two facing recesses in the head for receiving the protrusions, wherein the dimensions and pattern of the recessed end is the exact negative of the protrusions on the shank. This multiple form-locking is described as providing high stability, however the rigidity of this interconnection is limited due to one part being an exact negative of the other.

The means for clamping the head to the shank in DE 31 30 484 A1 includes a tensioning bolt which passes axially through the shank and which has a formed end that is approximately T-shaped in cross section. This formed end is receivable in a correspondingly shaped mounting recess in the head. However the mounting recess includes an end stop and the arrangement is such that the head can be assembled on the shank from one sideways direction only. Furthermore the head must be accurately positioned for the formed end to enter the mounting recess. This restricts the ease and therefore the rapidity with which one head can be exchanged for another on the shank.

DE 31 30 484 A1 also discloses that the end stop of the mounting recess in the head may include a screw. This would allow sideways adjustment of the position of the head relative to the shank, but the amount of such adjustment is quite limited.

DISCLOSURE OF THE INVENTION

The present invention seeks to provide an improved rotatable machine tool of the type having a head and a drive element which provides for diameter wise adjustment of the head. In comparison to the above described prior art, a machine tool according to the invention has improved rigidity and a head that is more readily able to be exchanged for another on a drive element.

According to a first aspect of the invention there is provided rotatable machine tool apparatus comprising:

a head for carrying a cutting means, a drive element for the head, wherein the head and the drive element include complementary means for detachably mounting the head to the drive element, the complementary means including a transverse slideway, a bearing part for seating within the-slideway and a clamping system, wherein the bearing part and the slideway are shaped and the clamping system is operable to force the bearing part to wedgingly engage the slideway for transmission of torque from the drive element to the head, and wherein the clamping system is operable to release the engagement force to allow sliding movement of the bearing part within the slideway for adjustment of the head transversely of the drive element.

The drive element could be a shank, or an extension piece or reduction piece that is connectable to a shank. Rotatable machine tools with which the invention is concerned normally include or are connectable to a shank that is mountable in a rotating drive means for the tool.

Typically the head will be for mounting a cutting means in the form of one or more removable carbide inserts which are attachable to the head by screws and each of which provides a cutting tip, although the invention includes apparatus wherein the head includes one or more integral cutting tips or is otherwise adapted for mounting a cutting means. For example the head could include a drill or collet chuck.

Preferably the transverse slideway is formed in the drive element and may be a slot within which a bearing part of the head seats, the bearing part being slidable within the slot. The slot and complementary bearing part may, in cross section, be of any suitable shape, preferably however, the slideway slot has sloping side surfaces which converge towards a base of the slot, and the bearing part includes sloped surfaces such that it wedgingly seats within the slot. The slope of the surfaces of the bearing part may correspond to the slope of the slot surfaces, in which case the base of the slot may comprise a channel section to provide clearance for the bearing part to wedgingly engage the slot.

The improved rigidity of the torque transmitting interconnection between the drive element and the head of the present invention is provided by the wedging of the bearing part within the slideway upon operation of the clamping system to apply a force that relatively draws the head into engagement with the drive element to secure the head in a selected position of transverse adjustment.

Preferably the clamping system includes a male member and a screw means for interacting with the male member wherein the male member is associated with one of the head or the drive element and the screw means is associated with the other of the head or the drive element.

Preferably the clamping system includes a male member on the head, and wherein the drive element receives the male member and includes a screw means for interacting with the male member to draw the head into engagement with the drive element and secure the one to the other.

The male member may be an integral part of the head, preferably however it is a separate piece that is removably attachable to the head such that its position relative thereto is axially adjustable. This feature can assist the wedging engagement between the head and the drive element (and thus the rigidity of the connection) in that the position of the male member relative to the screw means is alterable thereby allowing the force that can be applied to the male member by the screw means to draw the head into wedging engagement with the drive element to be increased. The interaction between the male member and the screw means may be via a ramp surface that is provided on each whereby operation of the screw means cams the male member, and thus the head, towards the drive element. Preferably the screw means also interlocks with the male member to secure the head to the drive element. Such an interlocking may be ensured by providing a circumferential groove in the male member within which the screw means seats. Thus the above described ramp surfaces for ensuring a wedging engagement between the head and the drive element may be provided by a frustoconical end on the screw means and sloping slides for the circumferential groove, the taper angle of each side of the groove being substantially equal with that of the side of the frustoconical end.

Preferably the attachment of the male member to the head is via a slide means associated with the head, whereby the male member and the head are relatively movable transversely of a longitudinal axis of the male member to provide the selected positions of transverse adjustment for the head.

Preferably the head includes locking means for securing the male member/slide means assembly in selected positions of transverse adjustment.

Preferably the male member is removably attached to the slide means. The locking means could be constituted, for example, by two opposed screws acting on the male member/slide means assembly whereby a "loosening" of one screw and a corresponding "tightening" of the other may produce the above described transverse adjustment and the secure locking of the parts in a selected position of such adjustment. It will be appreciated that with such an opposed screw type arrangement for the locking means of the adjustment mechanism it is possible to provide very fine or, in other words, micro level adjustability for the head transversely of a drive element and the secure locking of the head in a selected adjustment position. Such micro adjustability and securement admits of high accuracy and thus the mechanism may be used in precision cutting tools.

The invention also includes an adjustment mechanism that can be used in a rotatable machine tool apparatus. Thus according to a second aspect the invention provides an adjustment mechanism for adjusting the position of a head of a rotatable machine tool means transversely relative to a drive element of the tool means, the mechanism including a slide means associated with the head and a male member, the male member being attached to the slide means and being adapted for connection to a drive element, the head also including locking means for securing the male member/slide means assembly in selected positions of transverse adjustment relative to the head.

A clamping system that includes a male member extending from the head and receivable in a bore within the drive element, and a screw means associated with the drive element that interlocks with the male member, as is described above, provides for ready assembly and disassembly of a head from a drive element. Simply by unscrewing the screw means to disengage it from the male member allows the male member to be withdrawn from the bore to thereby remove the head from the drive element. Assembly of a head to a drive element is achieved by inserting the male member into the bore (possibly turning the head to align the bearing part with the slideway) and tightening the screw means—this is more readily accomplished than is possible with the described prior art.

BRIEF DESCRIPTION OF THE FIGURES

The invention will now be described, by way of example only, with reference to the accompanying drawings which illustrate embodiments of the invention in the form of precision boring tools.

In the drawings:

FIG. 1 is an exploded view of a boring tool according to a first embodiment of the invention;

FIG. 2 is an end view of the head of the tool of FIG. 1;

FIGS. 3 and 4 show, respectively, a partially sectioned plan view and a side elevational view of an assembled boring tool similar to that shown in FIG. 1;

FIGS. 5 to 7 show, respectively, a plan, a side elevational and an end view of the head of the tool of FIG. 1;

FIGS. 8 and 9 show, respectively, an elevational and an end view of a shank for assembly with a head such as shown in FIG. 1;

FIG. 10 is a sectional view along section line X—X on FIG. 9 of an end portion of the shank;

FIGS. 11 and 12, are, respectively, a plan and a side elevational view of a second embodiment of the invention;

FIG. 13 is an end view of the second embodiment as shown in FIG. 11; and

FIG. 14 is a sectional view along section line XIV—XIV on FIG. 12.

BEST MODE FOR CARRYING OUT THE INVENTION

In the drawings, corresponding features or elements in the various figures are indicated by a common reference numeral, except that in FIGS. 1–10 the numerals are in the number series 1 to 99 whereas in FIGS. 11 to 14 they are in the number series 100 to 199.

FIG. 1 shows a precision boring tool 1 in exploded perspective view. The boring tool 1 comprises a head 2 and a shank type drive element 3 that may be mounted in a drive means (not shown) for rotating the tool about its longitudinal axis 4. The drive element 3 includes a holder portion 5 from which extends a tapered shank portion 6. The specific form of shank shown in FIG. 1 is not essential to the invention, thus a drive element 3 may include a shank portion having different forms for mounting in a drive means. For example, FIG. 8 shows a drive element 3' having a holder portion 5 the same as in the FIG. 1–4 embodiment, but which includes a shank portion 6' of cylindrical form having flats 14. Also, a drive element according to the invention may be an intermediate extension piece or reduction piece which is drivingly connectable to a shank for mounting in a rotating drive machine.

Holder portion 5 of drive element 3 includes a transverse slideway in the form of a slot 7 within which a bearing part 8 of head 2 seats. Slot 7 and bearing part 8 provide an arrangement for transmission of torque from drive element 3 to head 2 which carries a cutting means in the form of a removable cutting tip 9. The torque transmission arrangement 7-8 is such as to allow head 2 to be adjusted transversely of the longitudinal axis 4 of the drive element 3 (via a mechanism to be described below) to allow the boring tool 1 to be set for cutting different diameters, the radial extent of such adjustment being illustrated by dimension lines a and b shown in FIG. 3.

Slot 7 is formed by opposed side surfaces 15 which slope inwardly towards a bottom channel portion defined by parallel walls 16 and a base 17. The bottom channel portion is relatively shallow. Each surface 15 has a slope of 30° to axis 4 such that the included angle defined by surfaces 15 is 60°.

The bearing part 8 of the head 2 is defined by opposite flats or surfaces 18 (e.g. see FIG. 2) which slope outwardly from an end face 19 of the head. Each flat surface 18 has a slope of 30° to axis 4 such that together they define an included angle the same as that of slot 7, that is 60°. The included angles of surfaces 15 and flats 18 are established to very close tolerances and each surface 15 and flat 18 is given a very smooth surface finish such that bearing part 8 of head 2 seats exactly within slot 7 of drive element 3, that is, the seating is such that effectively the whole area of each surface 15 lies in contact with a facing flat 18. The smooth finishes and matching accuracy of the complementary parts also ensures that surfaces 18 are readily slidable over surfaces 15 to facilitate transverse adjustment of head 2 (and thus cutting insert 9) relative to drive element 3.

A clamping system for securing head 2 to drive element 3 includes a male member 10 (which is attachable to head 2 via a slide 11) which is received within a bore 12 formed in drive element 3 in the base region 17 of slot 7. Male member 10 interacts with a clamping screw 13 in drive element 3 to clamp and interlock head 2 to the drive element 3, as will be described below.

Head 2 includes a transverse through bore 20 for receipt of a slide 11. The diameter of slide 11 is matched to that of bore 20 and their respective surfaces are given a smooth finish such that slide 11 slidingly seats within bore 20, that is, slide 11 is readily movable axially along bore 20 but has no play transverse to the axis. Slide 11 includes a centrally located threaded hole 21. Head 2 also includes a slot 24 that extends between end face 19 and bore 20.

Male member 10 includes a stem 22 having a threaded end 23, the thread of which matches that of hole 21 in slide 11. A screwdriver slot 25 may be provided in the end face of stem 22. Male member 10 is connected to head 2 via passage of stem 22 through slot 24 and engagement of screw end 23 in threaded hole 21 of slide 11 within bore 20.

Male member 10 also includes a cylindrical end section 26 that has a circumferential groove 27 formed therein. Groove 27 has opposed side walls 28 which slope inwardly towards the base of the groove. Each side surface may slope at 30° such that the included angle of side surfaces 28 is 60°.

Bore 12 in drive element 3 has a clearance end portion 29 of slightly larger diameter (see FIG. 10) otherwise the diameter of bore 12 is accurately and smoothly finished to match the diameter of cylindrical end section 26, which is also accurately and smoothly finished, such that cylindrical end section 26 of male member 10 can tightly slide into bore 12. A small longitudinal groove (not shown) along the circumferential surface of end section 26 is provided for passage of air to facilitate insertion and removal of male member 10 into and from bore 12. A threaded hole 30 in holder portion 5 of drive element 3 intersects bore 12. Set screw 13 (which may be a grub screw having a hexagon driving socket) having a frustoconical end 31 (the included angle of which may be 60°), is received in hole 30, and the relative positions of groove 27 on male member 10 and screw 13 in drive element 3 are such that the sloping surface of the frustoconical end 31 interacts with the innermost sloping side surface 28 of groove 27 such that on insertion of screw 13, the male member 10 and thus head 2 is cammed into engagement with drive element 3.

The bottom channel portion 16-17 of slot 7 and end portion 29 of bore 12 provide clearances such that the inwards force exerted on male member 10 by screw 13 (via ramp or camming surfaces 31 and 28) ensures that bearing part 8 of head 2 is wedgingly seated in slot 7 of drive element 3. The torque transmission interconnection that is so established is very rigid and enables excellent surface finishes to be obtained. Furthermore, because the complementary wedge shapes of bearing part 8 and slot 7 are the same at 60°, any loosening of screw 13 virtually immediately releases head 2 for transverse adjustment.

Slot 24 in head 2 is such that it allows transverse reciprocal movement of the male member-slide 10-11 assembly relative to head 2, the maximum possible extent of such movement being defined by contact of stem 22 with either end of the slot 24. Locking means for securing the slide assembly 10-11 in selected positions of transverse adjustment comprise two opposed set screws 31 and 33 (each of which may be a grub screw having a hexagon driving socket) the inner ends of which bear on stem 22 (as best illustrated in FIG. 3). Screws 32 and 33 are respectively received in threaded holes 34, 35 in head 2 (see FIGS. 5–7) which open to the ends of slot 24.

The extent of slot 24 may be such that when stem 22 contacts one end, the axis of the stem is coaxial with axis 4 of the boring tool 1. When the stem is locked in this position on tightening of the opposing set screw 32 (after which the other screw 33 may be tightened into contact with stem 22), the tool will be set to its minimum machining diameter, which is the position shown in full in FIG. 3 and is represented by radius a. The maximum machining diameter is then defined by the length of the slot 24 as is established when stem 22 contacts the other end of the slot which is represented by radius b in FIG. 3. Intermediate adjustments from an initial datum position (which may be the minimum diameter position) may be established by loosening one screw, say 32, by a set amount and tightening the opposite screw 33 by the same amount, which will move the head transversely to the longitudinal axis 4. By suitable selection of the thread pitch for holes 34, 35 and screws 32, 33, it is possible to provide either coarse or fine levels of adjustability for a cutting tool. For example, for a precision boring tool as shown in the Figures, M6 size set screws having a thread pitch of 1 mm provide a suitably fine level of adjustability.

Head 2 of the boring tool 1 shown in FIGS. 1–7 includes a nose portion 36 having a surface 37 provided with a cutaway portion to provide a seat for the mounting thereon of a cutting insert 9. Surface 37 and its cutaway, and insert 9, are positioned and dimensioned such that the cutting tip of insert 9 and adjacent portions of the surface 37 lie in a diametrical plane of the head 2. Other surfaces 38, 39 of the nose portion 36 are such as to establish clearances as appropriate for the nose portion 36 relative to a workpiece (not shown) to allow an efficient cutting operation to proceed. Also, radiassed transitions are provided between surfaces on the head 2 at appropriate locations to eliminate corners or edges that would otherwise cause stress concentrations that might lead to failure of the head. FIGS. 4 and 6 show alternative shapes for a transition from the main body of head 2 to surface 37 of nose portion 36. Thus, in FIG. 4 a transition surface 40 having a large radius of curvature is shown, whereas in FIG. 6 there is a small radius of curvature 41 at the transition.

Head 2 may also include an axial hole 42 for accessing a screwdriver slot 25 in stem 22 of male member 10.

The invention is not limited to the cutting means arrangement that is illustrated in the Figures and described herein. Thus the invention is intended to encompass all cutting means arrangements, either integrally formed with the head or including a separate cutting insert or bit that is mountable on the head, as are suitable for use in a rotatable machining tool composed of at least two parts, such as a cutting head and a drive element for the head.

A drive element 3 and head 2 according to the invention may be manufactured from cylindrical stock of a suitable metal, for example a chrome-nickel-steel, which is machined and ground to give the required shapes and finishes and then hardened as required.

FIGS. 11 to 14 show a precision boring tool 101 composed of a drive element 103 and a head 102 having adjustable twin cutters. The torque transmitting connection between head 102 and drive element 103 is the same as that in the previously described embodiments (to which reference can be made for a full explanation). Thus the head 102 is connected to the drive element 103 via a male member 110 attached to a slide 111 which is received within a bore 120 passing through head 102. The FIGS. 11–14 embodiment differs from the previously described embodiments in that head 102 is composed of two parts 150 and 151 which are transversely slidable relative to each other. Each part is generally semi cylindrical, apart from the section between semi bores 120 and end face 119. Thus, with reference to FIG. 14, part 151 has an upstanding section 152 on one side of a semi slot 124 (which slot is for accommodating the stem 122 of male member 110 and may be of less transverse length than slot 24 of the previous embodiments) and the section on the opposite transverse side of semi slot 124 is removed. Similarly, part 150 has an upstanding section 154 and correspondingly removed section. When the parts 150 and 151 are assembled, the upstanding section 152 or 154 of each occupies the removed section of the other. Each upstanding section 152, 154 includes a threaded hole within which is received a set screw 132, 133. Thus, adjustment screw 132 is associated with one part 150 of head 102 and the other adjustment screw 133 is associated with the other part 151 of head 102 such that each is able to transversely adjust its associated part relative to stem 122 of male member 110. As the longitudinal axis of stem 122 coincides with the longitudinal axis (of rotation) of tool 101, it will be appreciated that each part 150, 151 of head 102 is individually adjustable to establish a desired cutting diameter between a minimum and maximum as indicated by dimensions a and b in FIG. 11.

The flat diametrical surface 137 of each part 150, 151 is machined and ground to be very smooth and is provided with a seat for the attachment of a respective cutting insert 109, each of which is attachable by a screw as indicated at 155, similar to the previously described embodiments. Also surfaces 138, 139 are established by grinding to provide a nose portion on each part 150, 151 for carriage of each respective cutting insert 109. However, as in the previously described embodiments, other cutting arrangements may be provided on each part.

The cutting machine tools described herein admit of ready assembly and disassembly of a head of the tool and a drive element for the head. This feature allows easy interchange of different tooling heads to meet varying machining requirements, for example the invention allows interchange of boring heads, collet or drill chucks, spot facing tooling, counterbore tooling, spade tooling and any other shape or form of cutting tool devices. The torque transmitting assembly of the invention is also very rigid and allows a super fine machine finish to be achieved. In particular, an included angle of 60° for the slideway on a drive element and a corresponding 600 for the bearing part on a head, gives a rigidity that can approach that of an integrally formed tool and a machined finish which, in some circumstances, avoids the need for subsequent grinding or honing or any other super finish. The wedge-like slide connection of the invention is such that its rigidity is not substantially affected by transverse adjustment of the head relative to the drive element. It is also readily releasable to allow for transverse adjustment of the head. Another feature of the described embodiments is that micro adjustability of the head relative to the drive element is provided by a pair of standard set screws. The male-female interlock has the same effect as a one-piece holder in strength because it stops vibration due to the dampening effect which is not achieved in prior tool holders.

The invention described herewith is susceptible to variations, modifications and/or additions other than those specifically described and it is to be understood that the invention includes all such variations, modifications and/or additions which fall within the spirit and scope of the following claims.

I claim:

1. Rotatable machine tool apparatus comprising:
   a head for carrying a cutting means,
   a drive element for the head,
   wherein the head and the drive element include complementary means for detachably mounting the head to the drive element,
   the complementary means including a transverse slideway which is a slot having sloping side surfaces which converge towards a base of the slot, a bearing part for seating within the slideway and a clamping system,
   wherein the bearing part and the slideway are shaped for the bearing part to wedge within the slideway on operation of the clamping system to force the bearing part to engage the slideway, wherein transmission of torque between the drive element and the head is via the bearing part wedged within the slideway,
   and wherein the clamping system is operable to release the engagement force to allow sliding movement of the bearing part within the slideway for adjustment of the head transversely of the drive element.

2. Rotatable machine tool apparatus as claimed in claim 1, wherein the slideway is formed in the drive element and the bearing part is an integral part of the head.

3. Rotatable machine tool apparatus as claimed in claim 1, wherein the bearing part includes correspondingly sloped surfaces to the side surfaces of the slot, and wherein the base of the slot comprises a channel section to provide clearance for the bearing part to wedgingly engage the slot.

4. Rotatable machine tool apparatus as claimed in claim 1, wherein the clamping system includes a male member and a screw means for interacting with the male member wherein the male member is associated with one of the head or the drive element and the screw means is associated with the other of the head or the drive element.

5. Rotatable machine tool apparatus as claimed in claim 4, wherein the male member is received within a bore in said other of the head or the drive element and wherein the male member and the screw means each include a ramp surface whereby operation of the screw means applies a camming force to the male member that acts in a direction along the axis of rotation of the machine tool apparatus.

6. Rotatable machine tool apparatus as claimed in claim 5, wherein the male member includes a circumferential groove having sloping side surfaces that converge towards a base of the groove and the screw means includes a frustoconical end for engaging the sloping sides of the circumferential groove.

7. Rotatable machine tool apparatus as claimed in claim 4, wherein the male member is associated with the head and the screw means is associated with the drive element.

8. Rotatable machine tool apparatus as claimed in claim 7, wherein the male member is detachably secured to the head.

9. Rotatable machine tool apparatus as claimed in claim 8, wherein the male member is secured to a slide means which is mounted in the head, whereby the male member and the head are relatively moveable transversely of a longitudinal axis of the male member to allow for adjustment of the head transversely of the drive element.

10. Rotatable machine tool apparatus as claimed in claim 1, wherein the apparatus includes locking means for securing the head in selected positions of transverse adjustment relative to the drive element.

11. Rotatable machine tool apparatus as claimed in claim 4, wherein the male member is secured to a slide means which is mounted in the head, whereby the male member and the head are relatively moveable transversely of a longitudinal axis of the male member to allow adjustment of the head transversely of the drive element, and wherein the apparatus includes locking means which comprises screw means associated with the head for fixing the slide means and male member assembly in selected positions transversely of the head.

12. Rotatable machine tool apparatus as claimed in claim 11, wherein the screw means comprises two opposed screws which act on the male member, wherein the head is transversely adjustable relative to the drive element by a loosening of one screw and a corresponding tightening of the other.

13. Rotatable machine tool apparatus as claimed in claim 1, wherein the head comprises two relatively transversely moveable parts each of which carries a cutting means, wherein each part includes a substantially planar diametral surface in facing contact with that of the other part, and wherein the substantially diametral contacting surfaces are transversely aligned with the slideway.

14. Rotatable machine tool apparatus as claimed in claim 3, wherein the sloping side surfaces of the slot and the correspondingly sloped surfaces of the bearing part each define an included angle of substantially 60°.

* * * * *